United States Patent
Zhou et al.

(10) Patent No.: US 9,406,115 B2
(45) Date of Patent: Aug. 2, 2016

(54) SCRATCH DETECTION METHOD AND APPARATUS

(75) Inventors: Wei Zhou, Saint Paul, MN (US); Michael Grant, Minneapolis, MN (US)

(73) Assignee: Rudolph Technologies, Inc., Flanders, NJ (US)

( * ) Notice: Subject to any disclaimer, the term of this patent is extended or adjusted under 35 U.S.C. 154(b) by 372 days.

(21) Appl. No.: 13/806,360

(22) PCT Filed: Jun. 30, 2011

(86) PCT No.: PCT/US2011/042656
§ 371 (c)(1),
(2), (4) Date: Mar. 14, 2013

(87) PCT Pub. No.: WO2012/006221
PCT Pub. Date: Jan. 12, 2012

(65) Prior Publication Data
US 2013/0216122 A1    Aug. 22, 2013

Related U.S. Application Data

(60) Provisional application No. 61/361,386, filed on Jul. 3, 2010.

(51) Int. Cl.
*G06K 9/62* (2006.01)
*G06T 7/00* (2006.01)
*G02B 21/00* (2006.01)

(52) U.S. Cl.
CPC ............ *G06T 7/0004* (2013.01); *G02B 21/006* (2013.01)

(58) Field of Classification Search
None
See application file for complete search history.

(56) References Cited

U.S. PATENT DOCUMENTS

| 5,038,048 | A | * | 8/1991 | Maeda et al. | 250/559.41 |
|---|---|---|---|---|---|
| RE33,956 | E | | 6/1992 | Lin et al. | |
| 5,179,419 | A | * | 1/1993 | Palmquist | G01N 21/952 356/237.2 |
| 5,204,910 | A | | 4/1993 | Lebeau | |
| 5,745,239 | A | * | 4/1998 | Chen et al. | 356/629 |
| 6,181,474 | B1 | | 1/2001 | Ouderkirk et al. | |
| 6,295,131 | B1 | | 9/2001 | Yamaba et al. | |
| 6,456,899 | B1 | * | 9/2002 | Gleason et al. | 700/212 |
| 6,853,744 | B2 | * | 2/2005 | Mueller et al. | 382/147 |
| 7,783,104 | B2 | * | 8/2010 | Kawaragi | 382/149 |
| 2003/0113009 | A1 | | 6/2003 | Mueller et al. | |
| 2003/0138978 | A1 | | 7/2003 | Tanaka et al. | |
| 2005/0146715 | A1 | | 7/2005 | Lin et al. | |
| 2007/0127807 | A1 | * | 6/2007 | Koshikawa | G06K 9/00 382/149 |
| 2008/0162065 | A1 | | 7/2008 | Takeda et al. | |

(Continued)

OTHER PUBLICATIONS

International Search Report (PCT/US2011/042656) mailed Oct. 28, 2011 (2 pages).

(Continued)

*Primary Examiner* — Brian P Werner
(74) *Attorney, Agent, or Firm* — Dicke, Billig & Czaja, PLLC

(57) ABSTRACT

A method of identifying discontinuities in the surface of a substrate is herein disclosed. An object plane of an imaging system is positioned at a focal position associated with a discontinuity and an image is captured, the discontinuity having a relatively higher contrast with respect to the remainder of the surface of the substrate. The discontinuity is thereby more readily discernable than when the focal plane is positioned at the surface of the substrate. Analysis of discontinuities may include the extraction of discontinuity characteristics.

19 Claims, 8 Drawing Sheets

(56) References Cited

U.S. PATENT DOCUMENTS

| | | |
|---|---|---|
| 2009/0233188 A1 | 9/2009 | Amano et al. |
| 2010/0104955 A1 | 4/2010 | Shiota |
| 2010/0119144 A1 | 5/2010 | Kulkarni et al. |
| 2010/0171769 A1 | 7/2010 | Kamio et al. |
| 2011/0170090 A1 | 7/2011 | Naftali et al. |

OTHER PUBLICATIONS

Written Opinion of the International Searching Authority (PCT/US2011/042656) mailed Oct. 28, 2011 (6 pages).

* cited by examiner

SCRATCH DETECTION METHOD AND APPARATUS

CROSS-REFERENCE TO RELATED APPLICATION

This application is U.S. national stage application claiming priority under 35 U.S.C. §371 to International Application Serial No. PCT/US11/42656, filed on Jun. 30, 2011, which claims the benefit of U.S. Provisional Patent Application Ser. No. 61/361,386 filed on Jul. 3, 2010; the teachings of all of which are incorporated herein by reference.

TECHNICAL FIELD

The present invention relates generally to methods for inspecting semiconductor substrates and characterizing features found thereon. In some embodiments, the present invention relates to inspecting semiconductor wafers that have undergone a chemical mechanical planarization process for scratches and the characterization of the scratcheS

BACKGROUND

Capturing images of features of a substrate such as scratches formed into an upper surface of a semiconductor wafer can be a very difficult task. The illumination techniques used to obtain brightfield 2D images of the surface of the wafer for inspection purposes very often do not provide sufficient contrast with respect to the scratches that are of interest. Accordingly, it can be difficult to use a standard brightfield 2D inspection system to inspect a substrate for fine scratches and marks. Many practitioners resort to other types of illumination such as darkfield illumination. Darkfield illumination is well suited to picking out small discontinuities such as fine scratches and marks in the substantially specular surface of a semiconductor wafer.

Providing darkfield illumination in a 2D inspection system is well-known. Even so, additional illumination arrangements add cost and complexity to a 2D inspection system. Accordingly, imaging small features such as scratches and other defects formed into the surface of a substrate such as a semiconductor wafer using pre-existing brightfield illumination is desirable.

SUMMARY

One aspect of concepts disclosed herein includes a method of inspecting a surface of a substrate. The method includes identifying a potential discontinuity of interest that may appear at the surface of the substrate. A range of focal distances correlated with the potential discontinuity of interest is determined and a focal plane of an imaging system is positioned with the range of focal distances. An image of the substrate is captured and the presence of a discontinuity of interest on the substrate, if any, is determined.

In another aspect, a method of inspecting a substrate for discontinuities includes positioning a focal plane of an imaging system above a surface of the substrate such that the surface of the substrate is out of focus to the imaging system. The focal plane of the imaging system simultaneously is coincident with a range of a focal distances of light returned from one or more discontinuities in or on the surface of the substrate. An image of the substrate and the discontinuity, if any, is captured. The image is processed to identify the discontinuity.

In yet a further aspect, a method of determining an effective depth of a reflective discontinuity in a surface is disclosed. The method includes capturing a plurality of images of the surface. Each image in the plurality corresponding to the same lateral two-dimensional area on the surface under inspection and to a different longitudinal height with respect to the surface. A discontinuity is identified within the lateral area on the surface. Image-to-image variations in brightness of the discontinuity are recorded within the plurality of images as a function of the longitudinal height. A longitudinal height that corresponds to a maxima in the variation in brightness and at least one geometric characteristic of the discontinuity are determined.

BRIEF DESCRIPTION OF THE DRAWINGS

FIG. 3B is a schematic illustration of pixel intensities observed by an imaging sensor when the surface of a substrate is coincident with the focal plane of an imaging system.

FIG. 3C is a schematic illustration of pixel intensities observed by an imaging sensor when the object plane of an imaging system is positioned above an upper surface of a substrate at a focal point defined by a discontinuity in the surface of the substrate.

FIG. 3D is a schematic illustration of pixel intensities observed by an imaging sensor when the object plane of an imaging system is positioned below an upper surface of a substrate at a focal point defined by a discontinuity in the surface of the substrate.

DETAILED DESCRIPTION

Figure 1:
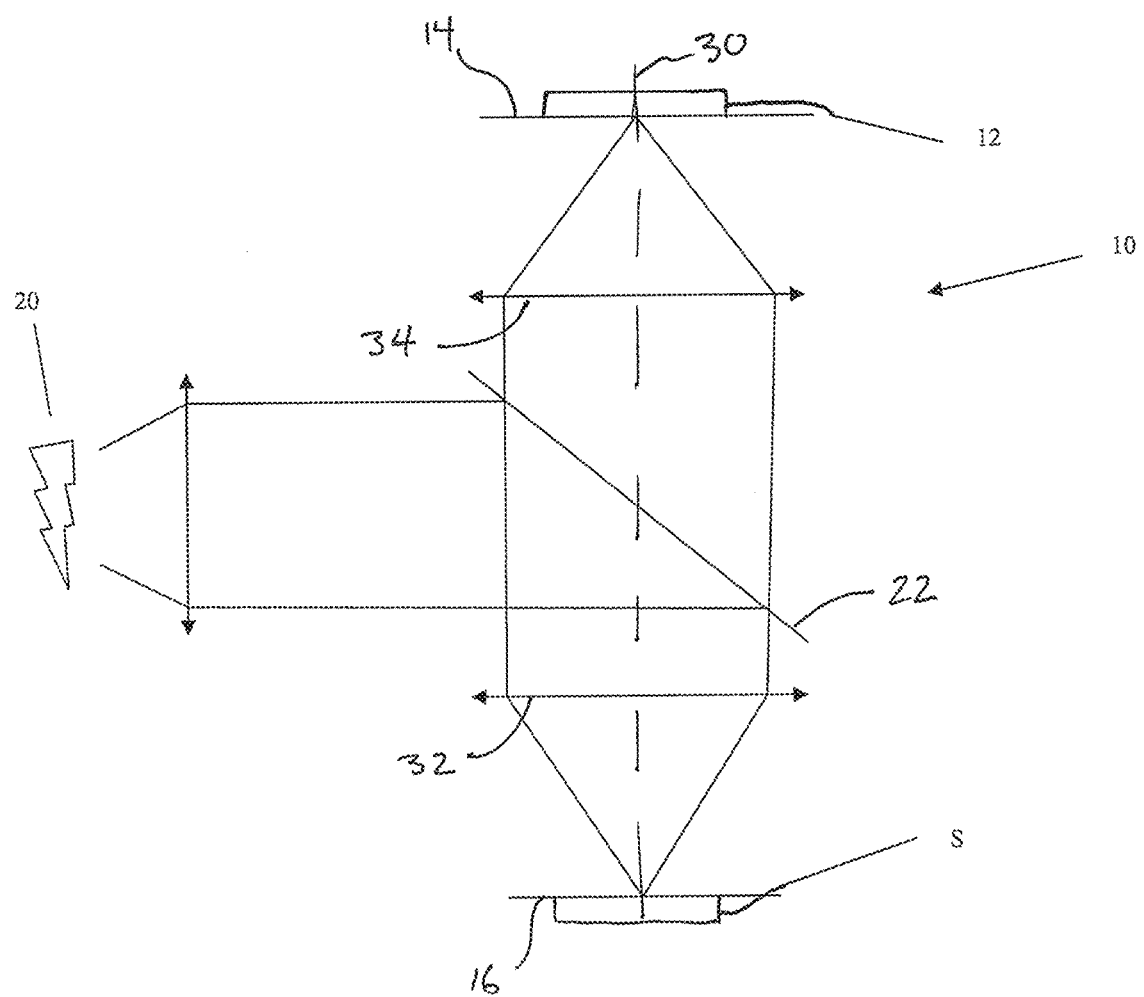
FIG. 1 illustrates one embodiment of a brightfield imaging system.

In the following detailed description of the invention, reference is made to the accompanying drawings that form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims and equivalents thereof The imaging system 10 seen in FIG. 1 is typical of 2D inspection systems used to inspect substrates S such as semiconductor wafers. Variations on the imaging system 10 illustrated in FIG. 1 may readily be adapted to various inspection applications as will be appreciated by those skilled in the art. The imaging system 10 generally consists of an imaging device 12 such as a CCD or CMOS sensor for forming an image of the substrate S from light returned from the surface of the substrate S. Light from an illuminator 20 is directed down onto the surface of the substrate S by a turning or coupling element 22. The turning element 22 is in some embodiments a beam splitter, but optical fiber couplings may be used as well. Optical elements such as lenses or groups of lenses are used to focus light from the illuminator 20 onto the surface of the substrate S and return light from the surface of the substrate S to the imaging device 12. It will be appreciated that the exact nature of optical elements useful in the imaging system 10 will differ depending on the application to which the imaging system 10 is put.

Imaging system 10 is coupled to a controller (not shown) such as, for example, a microprocessor or a personal computer that sends commands to and receives data from the imaging sensor 10, focusing mechanisms (not shown), and stages (not shown) on which a substrate may be supported, moved and aligned. The controller may be a single device or may be a distributed network of compatible devices that coordinate and carry out tasks related to the operation of the imaging system 10. The controller may run software programs for coordinating the capture of images by the imaging sensor 12 and may run additional software for identifying discontinuities or defects in the captured images. The controller may run yet more software for performing yield management analysis, for making pass/fail assessments of substrates S or portions thereof, and for controlling the actions of one or more related systems. The controller may also be connected to a host controller as part of a distributed system that schedules the processing of a substrate S by a plurality of processing systems.

The imaging system 10 has an image plane 14 at which is located the imaging device 12. The imaging system 10 has a focal plane 16 that is in FIG. 1 coincident with the substrate S surface, i.e. an object plane. The image plane 14 and the focal plane 16 are spaced apart from one another along an optical axis 30 of the imaging system 10. Where the object plane and the focal plane 16 are coincident, the upper surface of the substrate S will be in focus at the imaging sensor 12 positioned in the image plane 14. While it is desirable to have the focal plane 16 perfectly coincident with the surface of the substrate S that is being imaged, acceptable quality images may be obtained so long as the upper surface of the substrate S that is being imaged is within a predetermined distance of the focal plane 16 along the optical axis 30. The aforementioned predetermined distance is defined by the optical characteristics of the imaging system 10 and may be above or below the object plane 16 of the imaging system 10; it is commonly referred to as the depth of field.

As is well understood, an objective 32 may be moved along the optical axis 30 to change the position of the focal plane 16 along the optical axis 30. Alternatively, one may move the substrate S along the optical axis 30 in order to move the substrate S relative to the focal plane 16. Note that the objective 32 may include one or more optical elements or lenses as required for a particular imaging application. Similarly, camera lenses 34 are provided to focus light returned from the substrate S onto the imaging sensor 12.

Figure 2:
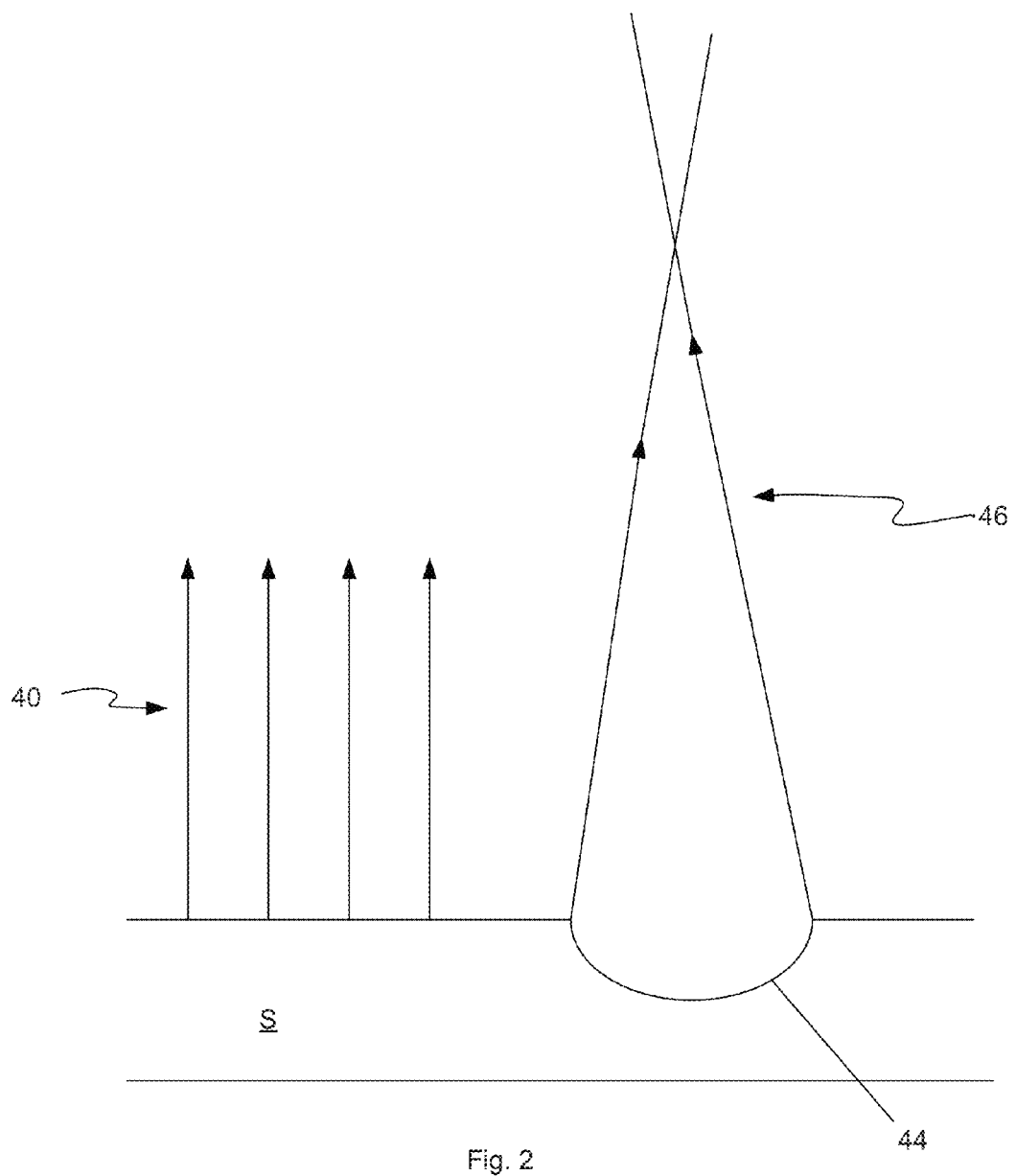
FIG. 2 schematically illustrates how light beams are returned from the surface of a substrate to be captured by an imaging system according to one embodiment of the present invention.

In a brightfield imaging system such as the imaging system 10, light from the illuminator 20 is incident upon the object being imaged (i.e. the substrate S) in a normal orientation. Where the object being imaged has a specular surface, the light incident on the surface of the object in imaged will be reflected from that surface directly toward the imaging sensor 12 as represented schematically by arrows 40 in FIG. 2. Where the surface of the substrate S is interrupted by a discontinuity such as scratch 44, light returned from the surface of the discontinuity will be reflected as represented by arrows 46. Where the defect reflects sufficient of the light incident thereon, an image of the substrate S captured with the focal and object planes coincident with one another will show the discontinuity 44 as a relatively dark region. The remainder of the relatively specular surface of the substrate S will appear to be relatively bright. This is because the light returned from the discontinuity 44 is not focused onto the image sensor 12.

Figure 3:
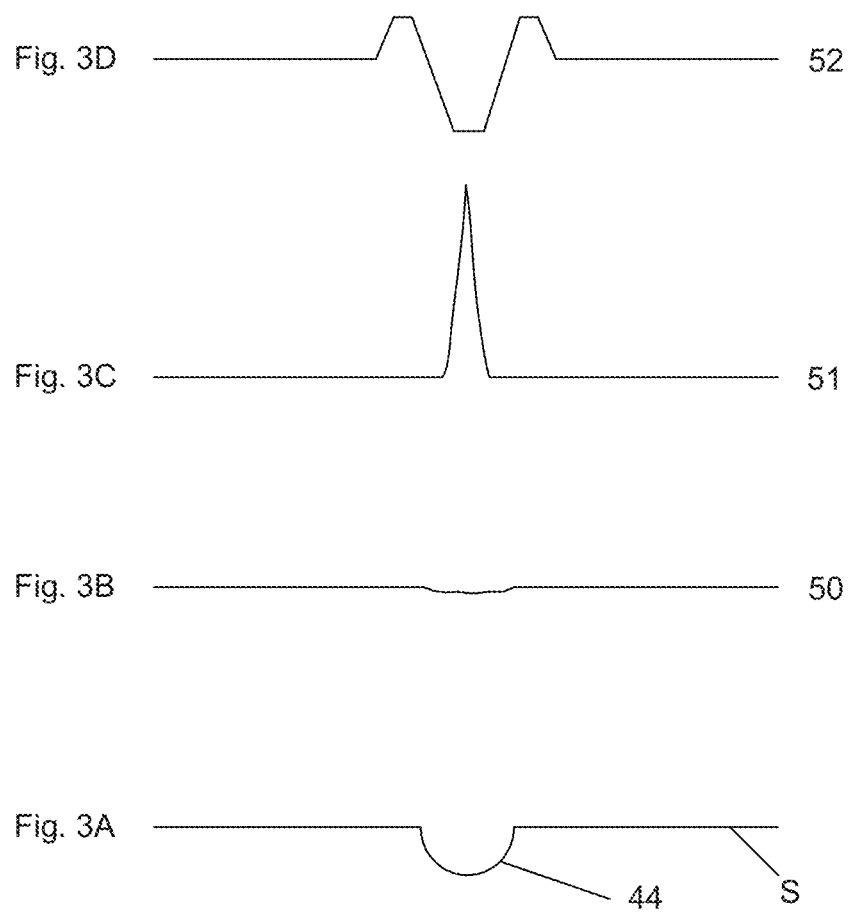
FIG. 3A is a schematic illustration of a scratch in the surface of a substrate.
FIGS. 3B-3D are spatially aligned with FIG. 3A.

FIGS. 3B-3D illustrates relative image pixel intensities captured by an imaging sensor 12 when the imaging system 10 has its focal plane 16 positioned at different focal positions. In FIG. 3A can be seen a representation of the substrate S that is being imaged; the substrate S has a discontinuity 44 formed therein. In FIG. 3B can be seen a pixel intensity graph 50 that represents a pixel intensity captured by an imaging sensor 12 when the focal plane 16 of the imaging system 10 is positioned directly at the upper surface of the substrate S. Note that the pixel intensity for the substantially planar and a specular upper surface of the substrate S is relatively constant except at the discontinuity 44. At the physical position of the discontinuity 44 the pixel intensity is slightly less than it is for the surrounding area as light returned from the scratch is not well focused upon the area of the imaging sensor 12 that corresponds to the position of the scratch 44. As the difference in pixel intensities for the discontinuity and the surrounding surface is relatively low, it may be difficult for a brightfield imaging system to discern the presence of the discontinuity.

In FIG. 3C can be seen a representation of pixel intensity 51 across the surface of the substrate S at the position of the discontinuity 44 when the focal plane of the imaging system 10 is positioned at a focal point defined by the geometry of the discontinuity 44. That is to say, the imaging system 10 is focused at a plane above the surface of the substrate S where the discontinuity 44 causes light to be focused. In this instance, the intensity of light sensed by the imaging sensor 12 over the substantially planar and a specular surface of the substrate S is relatively constant. However, at a position that corresponds to that of the discontinuity 44 on the substrate S, because light returned from the scratch 44 is focused at or near the focal plane of the imaging system 12 and therefore onto the image plane of the imaging system 10, the light intensity sensed by the imaging sensor 12 is relatively higher than that of the background represented by the surface of the substrate S. Therefore, by positioning the focal plane 16 of the imaging system 12 substantially at a focal position defined by a discontinuity or discontinuities in the surface of the substrate S (such as, for example, a scratch) the contrast of the resulting image may be increased to a point where the discontinuity may be more easily discerned using automated image processing techniques. As a result, automated inspection and assessment techniques may be carried out on the image of the discontinuity to provide information or characterizations of the substrate S and or the discontinuity itself.

In FIG. 3D can be seen a representation of pixel intensity 52 across the surface of the substrate S at a discontinuity such as a scratch 44 where the focal plane 16 of the imaging system is positioned below the surface of the substrate S. In this instance the center of the discontinuity 44 is relatively dark as the light returned from the discontinuity is out of focus with respect to the imaging sensor 12 that captures the pixel intensity information. In some instances the pixel intensity corresponding to the area immediately adjacent to the discontinuity will be seen to be somewhat higher than the pixel intensity related to the substantially planar and specular upper surface of the substrate S. This is because light returned from the discontinuity is incident upon the imaging sensor 12 thereof that corresponds to the area adjacent to the discontinuity itself.

Note that in the foregoing examples, the surface of the substrate S is visible as a background in the images obtained at focal positions above or below the surface of the substrate S. To the degree that the surface of the substrate S is positioned away from the focal plane of the imaging system 10, the surface of the substrate will appear more or less diffuse or blurry. Some imaging techniques such as confocal imaging will tend to exclude much of the background of the image that is visible in a standard microscope derived image.

There are two basic approaches to implementing substrate inspection as herein disclosed. The first involves defining a discontinuity or defect a priori and determining what focal position or positions that that category of discontinuity would exhibit. Once complete, one may set an focal plane 16 of an imaging system 10 at the specified focal position to capture images that contain the discontinuities that are of interest. Image processing techniques known to those skilled in the art may then be used to identify the discontinuities present on a substrate S (if any). Optionally, characteristics of the discontinuity such as size, depth, width, length, aspect ratio, shape, position, density, etc. may be extracted from the image in which the discontinuity appears. These characteristics may be used to analyze the performance of a process tool that performs an operation on the substrate S. This analysis might be used to modify the operation of such process tools or used to determine if the process is complete. Further, the analysis may be used to categorize the substrate itself and/or any sub-portions thereof (e.g. an individual die or device formed as part of a semiconductor substrate). This categorization may be graded or may be binary. For example, analysis may show that certain substrates or portions thereof are of low quality, medium quality, or high quality. Alternatively, a substrate or portions thereof may be graded simply as being of acceptable quality or unacceptable. Typically, unacceptable quality substrates will not receive additional processing and will instead be scrapped. In other instances, information obtained from such an inspection can be used to modify or control an entire fabrication process including scheduling the processing of substrates S by process tools, scheduling maintenance on process tools, or modifying the settings on process tools.

The second basic approach to implementing the inspection presented herein involves capturing images of a substrate S at one or more focal positions. Image processing techniques familiar to those skilled in the art are then used to identify discontinuities present in the images, if any exist. As an optional step, characteristics of the discontinuity such as size, depth, width, length, aspect ratio, shape, position, density, etc. may be extracted from the image in which the discontinuity appears. As described above, if a user so wishes, these extracted characteristics may be used to analyze the performance of a process tool that performs an operation on the substrate S. Another optional step may include the use of process control software to identify characteristics of discontinuities that are of interest to a user. For example, if a particular type of discontinuity tends to render a substrate and/or any sub-portions thereof a lower quality than is acceptable by a user, then the identified type of discontinuity may searched for during subsequent inspection operations.

Discontinuities in the surface of a substrate S may have many different causes or sources. For example, chips, cracks or scratches may be an inherent part of a substrate as a result of malformation of the substrate itself. Further, chips, cracks, scratches, or debris may be caused by or be a result of many different processes to which a substrate is subjected. For example, in the semiconductor industry, coating processes, deposition processes, sputtering processes, etching processes, lithography processes, or even handling or storage of substrates may cause or be the source of discontinuities in the surface of a substrate.

Figure 4:
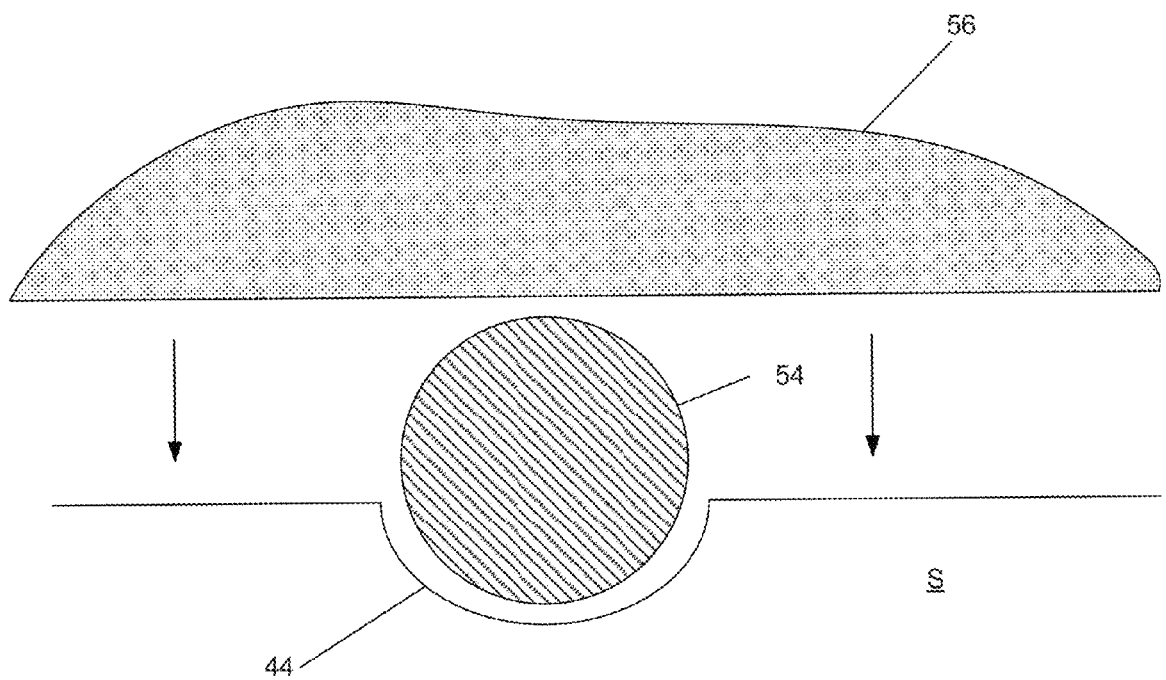
FIG. 4 is a schematic cross sectional representation of a discontinuity being formed in a substrate during a processing step.

One type of discontinuity that is of interest in the semiconductor industry are scratches left in the surface of a semiconductor substrate S by a chemical mechanical planarization (CMP) process. CMP processing is a grinding process that involves the use of an abrasive slurry deposited between a substrate and a pad. CMP processing may be conducted on an upper and/or lower surface of a semiconductor substrate S. FIG. 4 illustrates how an abrasive particle 54 may be driven into the surface of a substrate S during CMP processing. Slurry including abrasive particles 54 is introduced between the substrate S and the pad 56. The pad 56 and the substrate S are then moved relative to one another with the abrasive particle trapped therebetween. The relative motion grinds away the surface of the substrate S and will typically leave behind a number of characteristic scratches. Monitoring and/or assessing the output of a CMP process often involves optically inspecting a substrate S that has been subjected to the CMP process. Specifically, the scratches 44 left behind by the CMP process are imaged and analyzed to determine whether any problems occurred. Typical problems include large scratches left behind by overly large abrasive particles 54 and large or irregular scratches caused by the presence of unwanted particles or debris. Other characteristics of a scratch or scratches may also be of interest. For example, the extent and shape of a scratch may be indicative of the operation of a CMP processing system. The uniformity of scratches found on the surface of a substrate S processed in a CMP system may also be of interest.

Generally speaking the abrasive particles 54 used during the CMP process are of substantially the same size. Accordingly, the scratches made by such particles during the CMP process will share many of the same characteristics. One of the characteristics of a scratch made by an abrasive particle during the CMP process is its cross sectional shape. While it is to be understood that scratches made by abrasive particles during a CMP process may vary widely in many of their characteristics, it will typically hold true that scratches made by similar abrasive particles during a CMP process will be similar to one another. As a result, light returned from an array of similar scratches will be roughly focused at approximately the same position above the surface into which the scratches are formed. More precisely, light returned from an array of similar scratches will be focused within a range of focal positions above the surface into which the scratches are formed. As will be readily understood, positioning the focal plane of an imaging system 10 at a predetermined focal position, or as suggested above, within a predetermined range of focal positions characteristic of an array or set of similar scratches will maximize the contrast in the image with respect to those scratches to facilitate observation and analysis of the scratches using machine vision methods. Furthermore, because different abrasive particles or debris will create scratches in the substrate S that are substantially correlated to the different characteristics of those particles or debris, the phenomena described herein is generally useful in limiting a particular optical arrangement to capturing improved images of discontinuities that share selected the traits or characteristics. Further, a range of focal positions may be correlated to the size or other characteristics of the abrasive particles that form the scratches that are being imaged.

Figure 5:
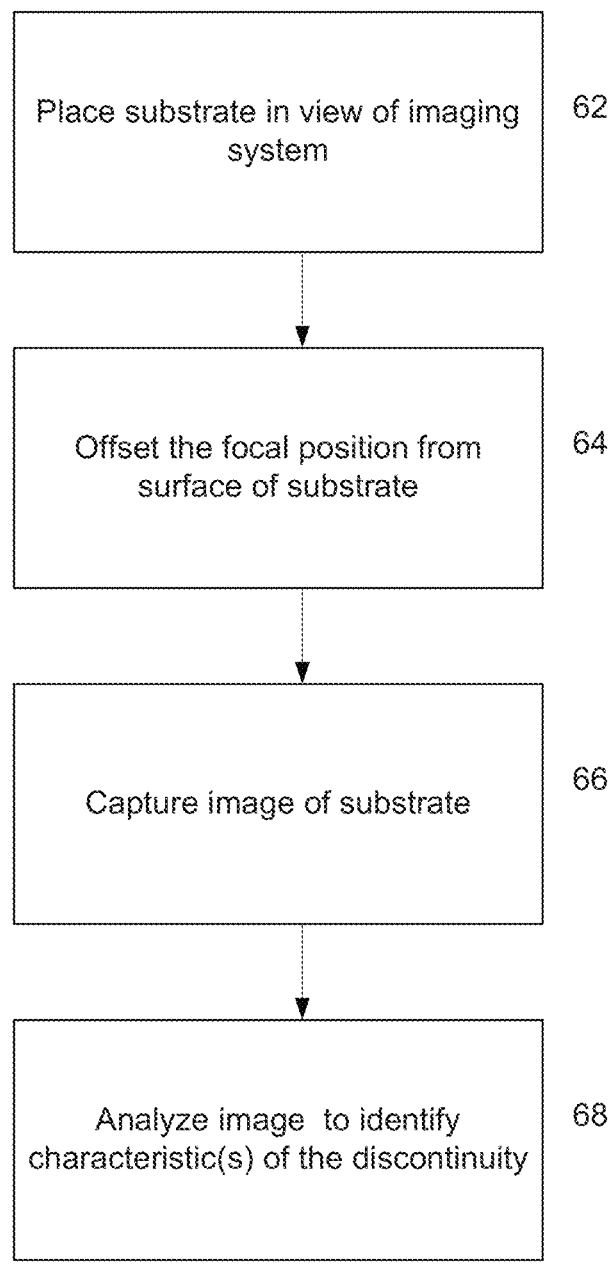
FIG. 5 illustrates a flow diagram of an embodiment of a method for inspecting a substrate.

In one embodiment of a method for inspecting a substrate schematically illustrated in FIG. 5, a substrate S is positioned in the field of view of an imaging system 10. (Step 62). The focal position of the imaging system 10 is then offset from the surface of a substrate S such that a surface of the substrate is out of focus. (Step 64). The magnitude of the offset between the nominal surface of the substrate S and the selected focal position may be determined on the basis of a number of considerations which will be described in greater detail hereinbelow. However, in one embodiment the magnitude of the offset into the focal position of the imaging system 10 is sufficient to create a requisite level of contrast between one or more discontinuities that are of interest and the remainder of the substrate S. Images of the substrate S are then captured. (Step 66). Analysis of the captured images may be carried out immediately upon capture or at some later time. Based on this analysis, characteristics of discontinuities of interest in the surface of the substrate S are identified. (Step 68).

Figure 6:
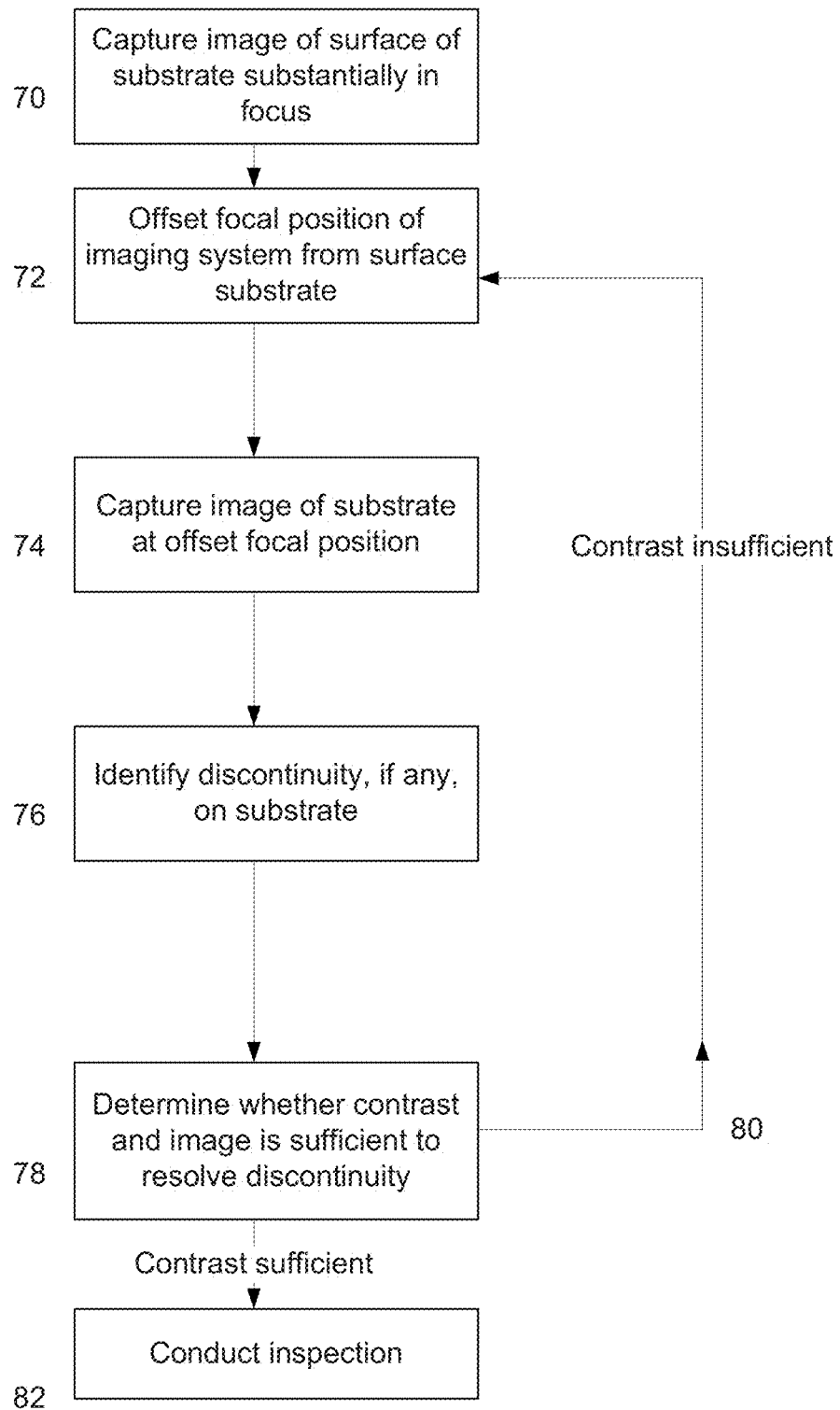
FIG. 6 illustrates a flow diagram of an embodiment of a method for inspecting a substrate.

The requisite level of contrast between one or more discontinuities present in the surface of a substrate and the remainder of the area of the surface of that substrate may be identified in an iterative manner as illustrated in FIG. 6. Optional step 70 involves capturing an image of the surface of a substrate when that surface is substantially in focus. Specifically, this optional step involves placing the focal plane of the imaging system 10 in a coincidental relationship with the upper surface of the substrate S. This image may be used for comparative purposes or for later inspection or analysis. The focal position of the imaging system 10 is offset from the surface of the substrate S (Step 72) and an image of the substrate S is captured (Step 74). Depending on how the operation is carried out, steps 76 and 78 may be carried out independently or as one step together. Specifically, one aspect of step 76 may involve an inherent assessment of contrast in a captured image in that a minimum amount of contrast between a discontinuity that is of interest and the background of the image must be present before the discontinuity can be discerned. Presuming that the minimum level of contrast necessary to identify discontinuities is present, one can assess the identified discontinuity to determine whether the contrast of this image is sufficient for the overarching needs of the user or the chosen application. (Step 78). Note that the needs of the user may be as simple as visually inspecting the captured image on a video screen (not shown) or as complex as performing a model- or threshold-based inspection and/or subsequent analysis. In any case, as machine vision techniques are typically used, it is preferable to obtain a level of contrast sufficient for an automated image processing system to conduct an inspection of the discontinuity. If it is determined that the contrast between the identified discontinuity in the background of the image is insufficient a user would be directed by path 80 back to step 72 to iterate the process. Where the contrast is found to be sufficient, the user would proceed to step 82, which in the embodiment illustrated in FIG. 5 involves conducting an inspection of the substrate S. Note that step 82 may involve more or less than conducting a full 2D inspection of the substrate S. This method is not limited to a full 2D inspection of the substrate S.

In another embodiment of substrate inspection, a focus position of similar discontinuities may be correlated to physical characteristics of the discontinuities. In order for light to be returned from a discontinuity in the surface of the substrate S and to be focused at a given focal distance above the surface of the substrate S, the discontinuity must exhibit physical characteristics sufficient to achieve this result. Using basic geometric and optical relationships, one could directly calculate a range of topographies that would result in light from a discontinuity being focused at a particular focal distance or range of focal distances. For example only, presuming that the bottom of a discontinuity such as a scratch approximates a cylindrical reflector, using the relationship $$f = \frac{R}{2},$$

where f is the focal distance and R is a radius of the reflector, one can determine that the depth of the discontinuity is equal to its radius and the width is approximately four times the focal distance of the imaging system 10. Similar approximations may be made where the topography of the discontinuity is modeled as an open sided polygon though it is to be understood that the exact relationship used to determine geometric characteristics of a discontinuity or scratch will depend on the nature of the discontinuity itself. Note that because of the variation in discontinuities such as scratches, it may be difficult to assess an actual width or depth of a discontinuity such as a scratch from a very small sample size. Statistical correlation may instead be necessary to relate observed focal positions to geometric characteristics of a discontinuity. However, based on direct verification using SEM images of the of the discontinuities themselves, it may be possible to correlate a specific focal distance or a range of focal distances to a particular discontinuity geometry.

Figure 7:
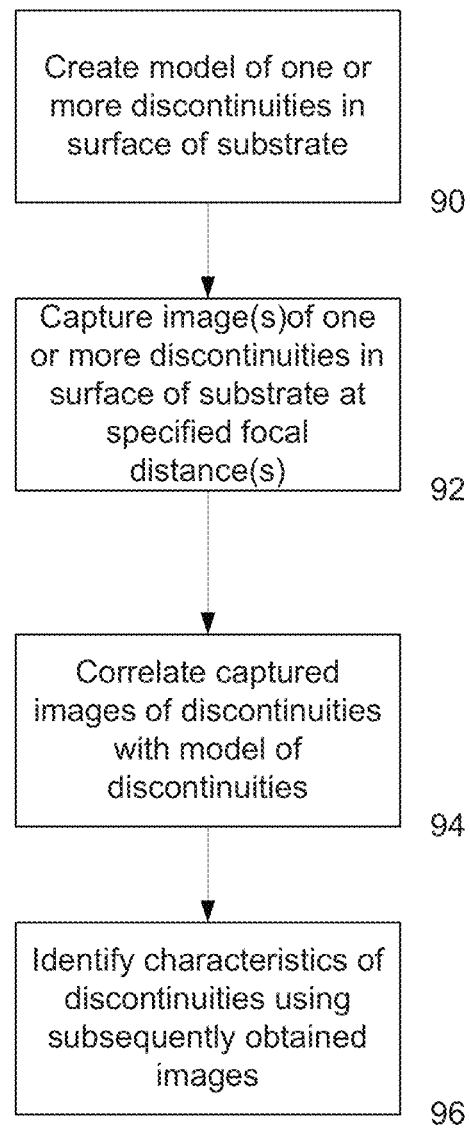
FIG. 7 illustrates a flow diagram of an embodiment of a method for inspecting a substrate.

Turning now to FIG. 7, the identification of characteristics of a discontinuity such as a scratch start with creating a model of the geometry or topography of the discontinuity itself. (Step 90). This model would include, at a minimum, information about a focal distance of light returned from the discontinuity measured from the surface of the substrate into which the discontinuity is formed. Preferably width and depth of the discontinuity would also be part of the model. Images of actual discontinuities in a substrate are subsequently captured (Step 92) and are correlated with the expected results provided by the model (Step 94). Note that the correlation step may require that the discontinuities imaged in step 92 be physically verified using a scanning electron microscope (SEM), an atomic force microscope, profilometer, laser triangulation system or other metrology system suitable for measuring the topography or geometry of discontinuities such as a scratch. Once an acceptable correlation between the predicted results obtained from the model and the actual results obtained from images captured by an imaging system 10 has been obtained, subsequently obtained images may be used to identify characteristics of discontinuities that have been modeled and correlated. (Step 96).

In some instances discontinuities such as scratches may be problematic only when their size falls outside of a given range. Accordingly, concepts presented herein may be used to monitor the operation of a CMP process without directly determining the geometry of a discontinuity or scratch. For instance, images of a substrate S may be captured at a number of discrete focal distances as measured from the surface of the substrate. Discontinuities present on the surface of the substrate S, if any, and their characteristics (such as length and position) and the specific focal distance at which the discontinuity was discernible are noted. Based on a subsequent assessment of the substrate itself, such as by using a scanning electron microscope (SEM) or the like or based on a subsequent assessment of operational quality of devices obtained directly from the substrate (such as the performance of individual semiconductor devices obtained from a wafer), a correlation between discontinuities that are discernible at a specific focal distance or range of focal distances and the quality of the substrate or devices obtained from the substrate may be made. So for example, where discontinuities that are visible at a specific focal position or range of focal positions are found to be related to low quality or damage to the substrate S or to portions thereof, that substrate S may be scrapped or further processed depending on the effect that the identified discontinuities have on the substrate and/or any devices that may be derived therefrom. Similarly, multiple inspections at multiple focus distances or ranges of focal distances may be obtained and the quantity and nature of discontinuities identified may be assessed. As a result of this assessment, the user of a CMP system may determine that the system is operating normally where the predominant type of discontinuity identified is from an acceptable focus distance or range of focus distances. Those skilled in the art will appreciate that any of the number of characteristics of a discontinuity such as, for example, length, width, absolute quantity, relative quantity, position, and proximity may be used to identify the proper or improper operation of a processing system such as a CMP system. As indicated above, any process tool or system that creates discontinuities such as scratches or other defects in the surface of a substrate S such that the discontinuities may be correlated with a specific focal distance or range of focal distances may be monitored using concepts presented herein.

Figures 8, 9, 10:
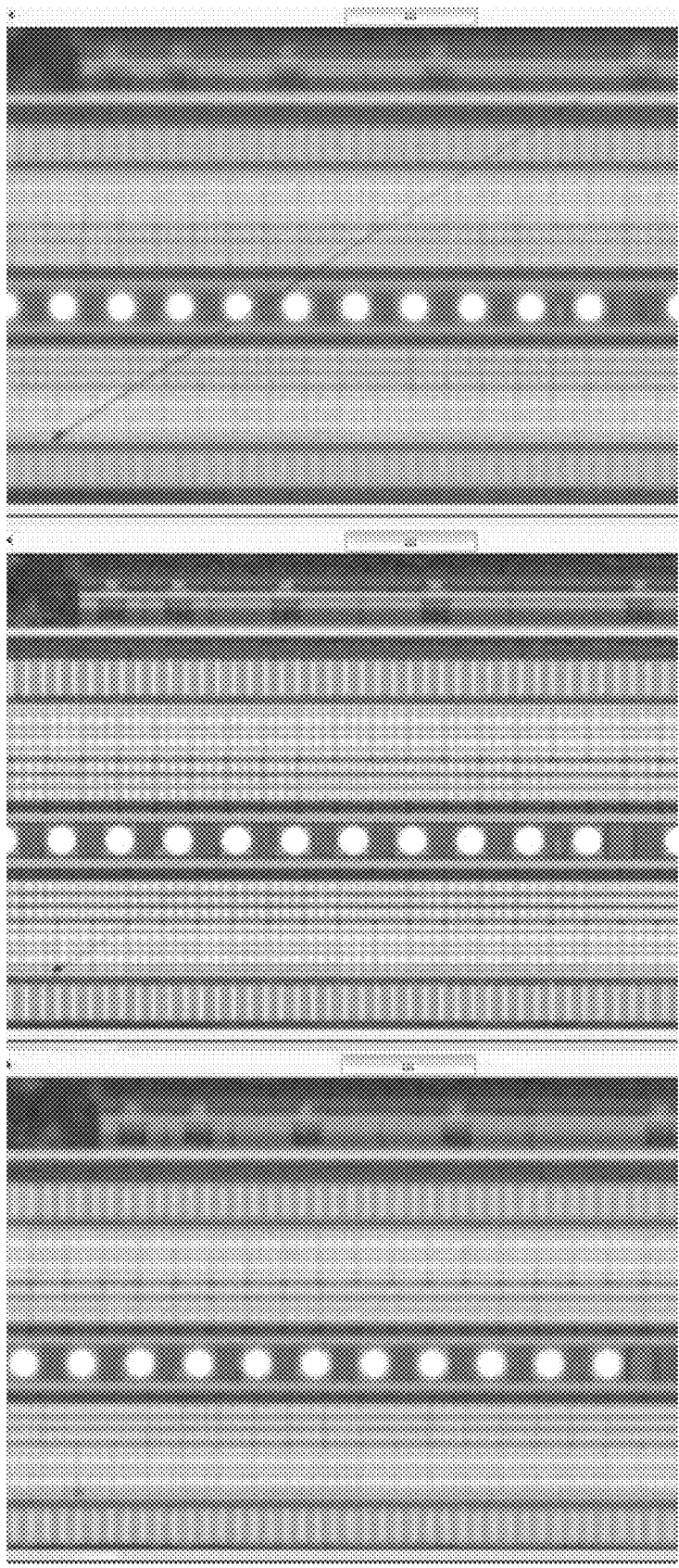
FIG. 8 is a grey scale image of a substrate wherein the focal plane of the imaging system is positioned below a surface of the substrate.
FIG. 9 is a grey scale image of a substrate wherein the focal plane of the imaging system is position substantially at the surface of the substrate.
FIG. 10 is a grey scale image of a substrate where in the focal plane of the imaging system is positioned above a surface of the substrate.

In one example of these concepts, a patterned silicon wafer was processed using a typical CMP system. Using an imaging system such as that described in U.S. Pat. No. 6,826,298, which document is hereby incorporated by reference, a 2D optical inspection of the wafer with the focal plane of the imaging system positioned at the surface of the wafer was conducted. The pattern formed on the wafer was clearly visible in the 2D inspection as illustrated in the image of FIG. 9. However scratches below a certain threshold size were not readily discernible in images captured by the imaging system at this optical arrangement, though if one looks closely, a human may be able to discern a scratch running diagonally from the upper left to the lower right in the image of FIG. 9. This type of scratch is not reliably detectable in images from 2D brightfield imaging systems by automated image processing methods though human viewers can often pick it out. The image shown in FIG. 9 corresponds generally to the pixel intensity representation 50 shown in FIG. 3B. By positioning the focal plane of the imaging system used to capture the image in FIG. 9 approximately 250μ above the surface of the wafer, the pixel intensity of the scratch is seen to increase with respect to the background pixel intensity of the image (contrast increases) and the scratch consequently becomes more discernable as can be seen in FIG. 10. The image in FIG. 10 corresponds generally to the pixel intensity representation 51 shown in FIG. 3C. The image shown in FIG. 8 was captured with the focal plane of the imaging system position approximately 250μ below the surface of the wafer. The scratch is just discernable in the image as a light line. The image shown in FIG. 8 corresponds generally to the pixel intensity representation 52 shown in FIG. 3D. As a result, using a standard brightfield 2D optical inspection system, one is able to more reliably perform automated imaging and inspection techniques to identify and analyze scratches and other discontinuities in the surface of a wafer that might not otherwise be readily discernable using brightfield illumination.

The imaging system 10 shown in FIG. 1 is similar to common light microscopes in wide use in various substrate processing industries including in semiconductor fabrication industries. However, other types of imaging systems and/or microscopy may be used. For example, because the concepts presented herein relates in part to positioning a focal plane of an imaging system, confocal imaging systems may be useful in capturing images of a substrate to identify discontinuities. Confocal imaging systems are constructed and arranged to omit or limit light that is returned from surfaces that are not in or near a focal plane of the imaging system. Typically this is done by interposing a small aperture into the optical path such that light that is not returned from at or near a focal plane is blocked. Various forms of confocal imaging including scanning confocal microscopes, programmable array microscopes, confocal chromatic sensors, and spinning disk (Nipkow) confocal systems may be used. Provided that enough of the surface of the substrate under inspection is imaged, discontinuities may readily be identified on a substrate, if any are present.

The imaging system 10 shown in FIG. 1, in one embodiment, can also be configured as a so called "light-field" or "plenoptic" camera to capture various characteristics of light rays reflecting from the substrate S, in particular 4D light field information including color, intensity and vectors associated with the rays. In such an embodiment, a plurality of lenses can be employed to capture the light field information. With the light field information, processing algorithms may be employed to identify one or more "virtual focal planes" wherein the captured information is processed to select one or more desired focal planes and generate an image of the substrate at the focal plane for further analysis based on the concepts presented herein.

CONCLUSION

While various examples were provided above, the concepts provided herein are not limited to the specifics of the examples. For example, the concepts may be used to inspect substrates such as glass, metallic or metal coated substrates, circuit boards or the like.

Although specific embodiments of various concepts have been illustrated and described herein, it will be appreciated by those of ordinary skill in the art that any arrangement that is calculated to achieve the same purpose may be substituted for the specific embodiments shown. Many adaptations of the concepts will be apparent to those of ordinary skill in the art. Accordingly, this application is intended to cover any adaptations or variations of these concepts. It is manifestly intended that these concepts be limited only by the following claims and equivalents thereof.

What is claimed is:

1. A method of inspecting a surface of a semiconductor substrate, comprising:
  identifying a potential discontinuity of interest that may appear at the surface of the substrate;
  determining a range of focal distances above the surface of the substrate and above the potential discontinuity of interest where light reflected from the potential discontinuity of interest is likely to be focused, the determined range of focal distances being at least partially different than a nominal focal distance of a system used for inspecting the surface of the semiconductor substrate at which the surface of the semiconductor substrate is substantially in focus;

positioning a focal plane of an imaging system with the range of focal distances;

capturing an image of the substrate; determining the presence of a discontinuity of interest on the substrate, if any, based on a level of contrast in the captured image between the discontinuity of interest and a background of the image; and characterizing the discontinuity of interest on the substrate, if any, by correlating a focal distance of the discontinuity of interest with a discontinuity characteristic including determining a depth and at least one of a width, a geometry, and a topography of the discontinuity based on the focal distance.

2. The method of claim 1, further comprising repeating the positioning, imaging and discontinuity determining steps at multiple focal position.

3. The method of claim 1, wherein the focal plane is positioned as to exclude the surface of the substrate.

4. The method of claim 1, further comprising providing an imaging system that is a microscope.

5. The method of claim 1, further comprising providing an imaging system that operates on a confocal principle.

6. The method of claim 1, further comprising:
positioning the focal plane of the imaging system substantially at a surface of the substrate;
capturing an image of the substrate; and
determining the presence of a defect in a structure formed on the surface of the substrate.

7. The method of claim 1 wherein the characterizing comprises determining characteristics selected from a group consisting of position, orientation, length, width, depth, aspect ratio, and the number of discontinuities per unit area of the substrate.

8. The method of claim 1, further comprising correlating a characteristic of the discontinuity of interest with a process step to which the substrate has previously been subjected.

9. The method of claim 8 wherein the process step is selected from a group consisting of chemical mechanical planarization, lithography, etching, thermal processing, and handling a substrate.

10. The method of claim 1, further comprising correlating the presence of a discontinuity of interest with a process step to which the substrate has previously been subjected.

11. A method of inspecting a semiconductor substrate for discontinuities, comprising:
positioning a focal plane of an imaging system above a surface of the substrate such that the surface of the substrate and one or more discontinuities in or on the surface of the substrate are out of focus to the imaging system, the focal plane of the imaging system simultaneously being coincident with a range of focal distances where light returned from the one or more discontinuities is likely to be focused, the range of focal distances being at least partially different than a nominal focal distance of a system used for inspecting the surface of the semiconductor substrate at which the surface of the semiconductor substrate is substantially in focus;
capturing an image of the substrate and the discontinuity, if any; and
processing the image to identify the discontinuity based on a level of contrast in the captured image between the discontinuity and a background of the image; and
correlating a focal distance of a discontinuity with a discontinuity characteristic including determining a depth and at least one of a width, a geometry, and a topography of the discontinuity based on the focal distance.

12. The method of claim 11, further comprising positioning the focal plane of the imaging system at at least one other position in which the focal plane of the imaging system is coincident with a second range of focal distances.

13. The method of claim 11, wherein the imaging system is selected from a group consisting of a light microscope, a scanning confocal microscope, and a chromatic confocal microscope.

14. The method of claim 11, further comprising:
performing at least one inspection with the focal plane of the imaging system out of focus with respect to the surface of the substrate; and
performing at least one inspection with the focal plane of the imaging system in focus with respect to the surface of the substrate.

15. The method of claim 11, further comprising:
reporting the discontinuity characteristic.

16. The method of claim 11, further comprising correlating a focal distance of a discontinuity with a characteristic of a cause of the discontinuity.

17. A method of determining an effective depth of a reflective discontinuity in a surface, comprising:
capturing a plurality of images of the surface, each image in the plurality corresponding to the same lateral two-dimensional area on the surface under inspection, each image in the plurality corresponding to a different longitudinal height with respect to the surface;
identifying a discontinuity within the lateral area on the surface;
recording image-to-image variations in brightness of the discontinuity within the plurality of images as a function of the longitudinal height;
determining a longitudinal height that corresponds to a maxima in the variation in brightness, wherein the determined longitudinal height is different from a longitudinal height of a nominal focal point of the surface; and
determining at least one geometric characteristic of the discontinuity including an effective depth of the discontinuity in the surface based on the determined longitudinal height.

18. The method of claim 1, wherein the potential discontinuity of interest comprises a scratch.

19. The method of claim 11, wherein the discontinuity comprises a scratch.

* * * * *